No. 863,601. PATENTED AUG. 20, 1907.
A. C. GAST.
MACHINE FOR TRIMMING WINDOW SHADES.
APPLICATION FILED JAN. 12, 1907.

3 SHEETS—SHEET 1.

No. 863,601. PATENTED AUG. 20, 1907.
A. C. GAST.
MACHINE FOR TRIMMING WINDOW SHADES.
APPLICATION FILED JAN. 12, 1907.
3 SHEETS—SHEET 2.
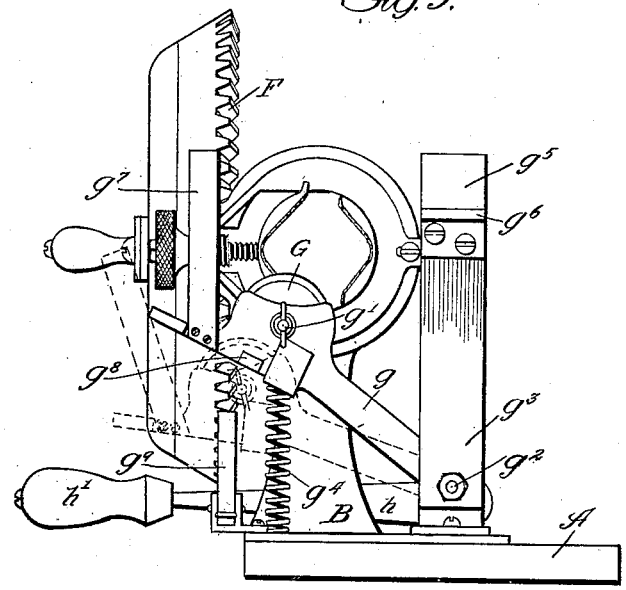
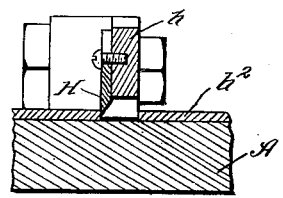
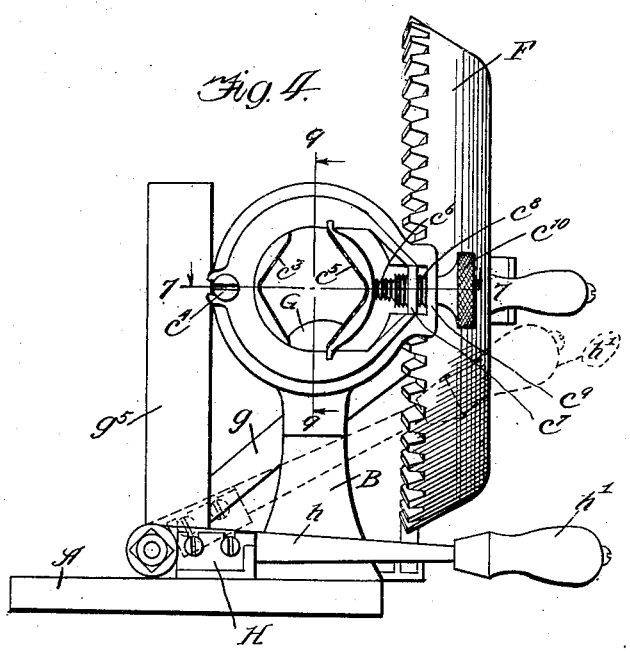
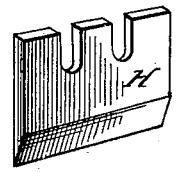
Witnesses:
Inventor:
Albert C. Gast
By Bulkley & Durand
Attys

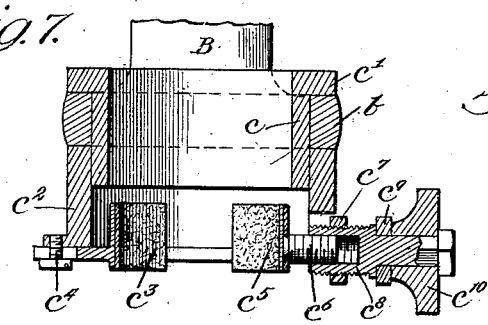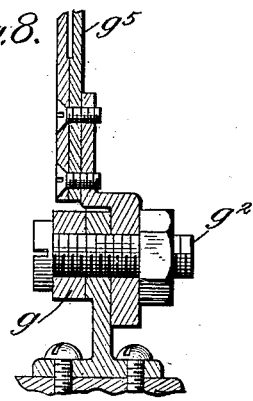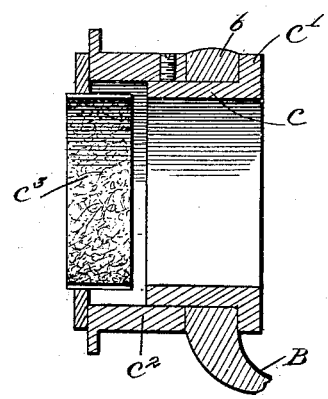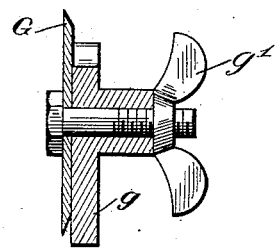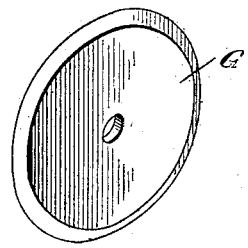

UNITED STATES PATENT OFFICE.

ALBERT C. GAST, OF ST. JOSEPH, MICHIGAN.

MACHINE FOR TRIMMING WINDOW-SHADES.

No. 863,601.  Specification of Letters Patent.  Patented Aug. 20, 1907.

Application filed January 12, 1907. Serial No. 352,061.

*To all whom it may concern:*

Be it known that I, ALBERT C. GAST, a citizen of the United States of America, and a resident of St. Joseph, Berrien county, Michigan, have invented a certain new and useful Improvement in Machines for Trimming Window-Shades, of which the following is a specification.

My invention contemplates an improved machine for trimming window shades, and for cutting off the rolls of the shades, as well as for cutting the lower sticks of the shades, without removing the shades from their rolls. Formerly, this kind of work was done by hand, or by machines which were unsatisfactory, with the result that the trimming was somewhat laborious and not always accurate; and so far as I now know I am the first to provide an efficient machine for this purpose. I accomplish this by rotating the shade rather than by rotating the knife or cutting means.

Figure 1:
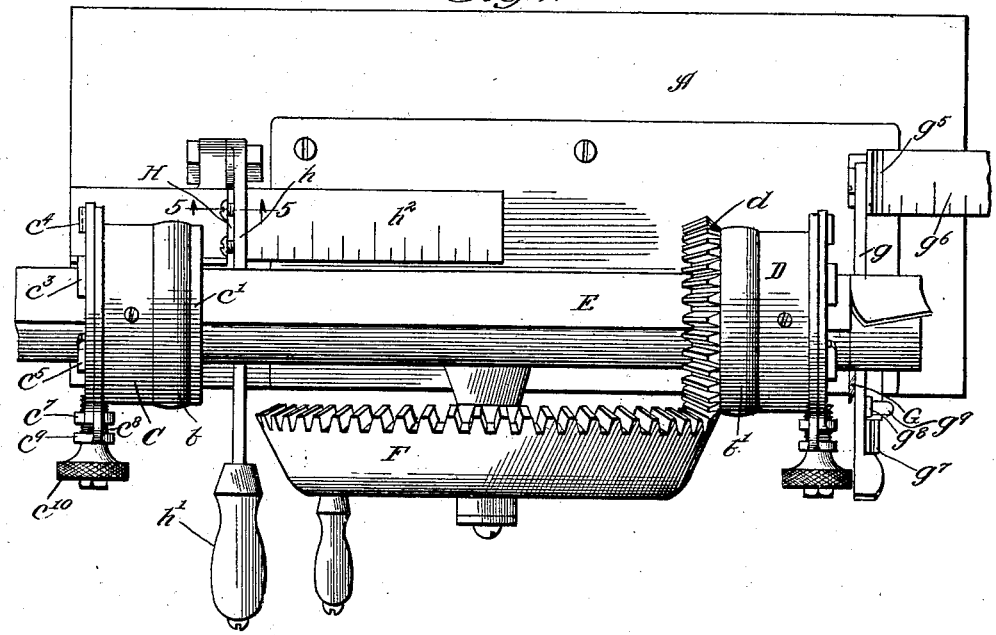
Figure 2:
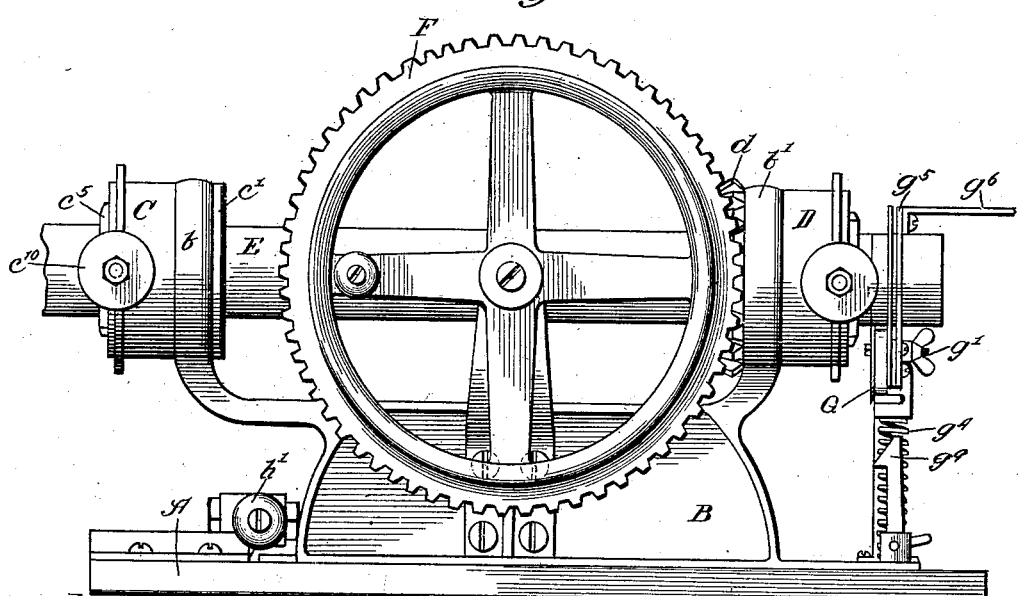

In the accompanying drawings: Figure 1 is a plan of a window-shade or curtain trimming machine embodying the principles of my invention. Fig. 2 is a side elevation of the same. Fig. 3 is an end elevation of the same. Fig. 4 is an elevation of the other end of said machine. Fig. 5 is a detail section on line 5—5 in Fig. 1. Fig. 6 is a perspective of the knife for cutting off the lower sticks of the shades. Fig. 7 is an enlarged detail section on line 7—7 in Fig. 4. Fig. 8 is an enlarged detail section of the stationary saw guide and adjacent parts. Fig. 9 is an enlarged detail section on line 9—9 in Fig. 4. Fig. 10 is a section of the knife for trimming the shades, showing the manner of mounting the same. Fig. 11 is a perspective of the said knife for trimming the shades.

As thus illustrated, my invention comprises a base A, upon which is secured the casting or body B of the machine. This body is provided with two axially alined bearings $b$ and $b^1$, in which the chucks C and D are mounted to rotate. These chucks receive the curtain roll and shade E wound thereon. The chuck C, for example, comprises a ring $c$ mounted to rotate in the bearing $b$ and provided with a flange $c^1$. A larger ring $c^2$ is slipped over the ring $c$ and rearwardly secured thereto. The bearing $b$ is held between the flange $c^1$ and the ring $c^2$. A movable clamping jaw $c^3$ is secured by a screw $c^4$ inserted in the ring $c^2$, and an opposed movable jaw $c^5$ is supported by a threaded stem $c^6$. The jaw $c^5$ has a frame portion $c^7$ engaged by a screw $c^8$, which latter has internal threads adapted to engage the stem $c^6$. Said ring $c^2$ has a bearing portion $c^9$ in which the adjusting screw $c^8$ is held by a thumb nut $c^{10}$ suitably secured thereon.

It will be seen that the screw threads are of such character that rotation of the thumb nut $c^{10}$ causes the jaws to move toward and away from each other, thus always keeping the rolled up shade located centrally of the chuck. Said jaws can be faced with cloth or otherwise adapted to engage and hold the rolled up shade without injuring the same. The chuck D is the counter part of the chuck C, except that the chuck D has a bevel pinion $d$. A large bevel gear F is mounted on the body and adapted to engage the said pinion $d$. This bevel gear F is provided with a handle for rotating it, and for thereby rotating the shade and roll held in the two chucks. Associated with the chuck D is a knife G mounted on a swinging arm $g$. This knife is disk-like in form and is secured to the arm by a thumb nut $g^1$, whereby the knife can be rotated to bring fresh cutting edge into play as fast as it becomes dull. Said arm $g$ is pivoted at $g^2$ upon a picket $g^3$ carried by the base or body. A spring $g^4$, interposed between the arm and the base, yieldingly presents the knife to the shade rolled on the wooden roll. A saw-guide $g^5$ and a graduated gage $g^6$ are mounted on the bracket $g^3$, the guide being slightly out of line with the knife G. By means of said gage the operator can determine accurately the amount to be cut off from the end of the shade and roll in order to reduce the same to the desired length. Another saw-guide $g^7$ is mounted on the arm $g$ and alined with the guide $g^5$. A lug $g^8$ on the arm $g$ is adapted to be engaged by the hook $g^9$ to hold the arm and knife down when a saw is inserted in the guides to cut off the roll. It will be understood that after the roll has been rotated sufficiently to cause the knife G to cut through the shade, the wooden roll is then cut off by a hand saw. It is for this purpose that the two saw-guides are provided. The stick for the lower end of the shade or curtain is cut off by the knife H which is mounted on the lever $h$. This lever extends at right angles to and below the chuck C, and the handle $h^1$, provided on the end of said lever, is within easy reach of the operator. A graduated gage $h^2$ enables the operator to determine the amount to be cut off from the end of the stick.

With a machine of this character the curtains or window shades are trimmed accurately and quickly, and with perfectly smooth edges. Shades which are too long can thus readily be cut down to the proper dimensions.

What I claim as my invention is:

1. In a machine of the class set forth, the combination of means for holding the rolled-up window shade, adapted to grip and keep the shade tightly wound on the roll, a knife and means for presenting it to the rotating and rolled-up shade, and means for causing relative rotation between the knife and shade, by rotating the shade while it is held against both endwise movement and unrolling.

2. A curtain or window shade trimming machine comprising stationary cutting means, holding means, adapted to grip and keep the shade tightly wound on the roll, and mechanism for producing relative movement between the cutting and holding means to trim off a portion of the shade, by rotating the shade while it is held against both endwise movement and unrolling.

3. A machine for the purpose specified, comprising rotatable means for tightly embracing and rotating the rolled-up shade, adapted to grip and keep the shade tightly wound on the roll, and a knife and means for presenting it to the rotating shade.

4. In a machine of the class specified, the combination of a plurality of rotary chucks for embracing the rolled-up shade, adapted to grip and keep the shade tightly wound on the roll, means for rotating one of said chucks, a cutting knife, and means for presenting the knife to the rotating shade.

5. In a machine for cutting or trimming window shades, the combination of means for encircling and holding and rotating the rolled-up shade, adapted to grip and keep the shade tightly wound on the roll, a disk-like knife, and spring means for yieldingly presenting the knife to the rotating shade.

6. The combination of means for embracing and effecting a trimming of the rolled-up shade, by rotating the said shade, and a saw-guide associated therewith, adapted to receive a saw for cutting off the roll within the shade.

7. In a machine for the purpose specified, a knife, an arm on which the knife is mounted, a spring for presenting the knife to the shade, a saw-guide on the arm, another saw-guide, and means for holding the arm in a depressed position when a saw is inserted in said guides to cut off the roll within the shade.

8. A curtain or window shade trimming machine comprising means for first trimming the rolled-up shade by rotation of the same means for then receiving the curtain stick, a knife for cutting off a portion of said stick, and means for operating said knife.

9. A machine substantially as above described, comprising a stationary cutting device, means for preventing the shade from unrolling, and means for rotating the rolled-up window shade.

10. A machine for the purpose set forth, comprising one or more rotary chucks for gripping and rotating the rolled-up shade, adapted to clamp and hold the shade against unrolling, means for cutting the rotating roll of shade cloth, and means for rotating said chuck or chucks.

11. The above described machine, comprising means for rotating the roll of shade cloth to trim off a portion thereof, means for preventing the shade from unrolling, and means for presenting a saw to the wood roll after the same has stopped rotating.

12. In a machine for the purpose specified, a knife, an arm on which the knife is mounted, a spring for presenting the knife to the shade, and a saw-guide on the arm.

Signed by me at Chicago, Ills., this 8th day of January, 1907.

ALBERT C. GAST.

Witnesses:
ALBERT JOHN SAUSER,
F. H. DRURY.